United States Patent
Gkalekos

(10) Patent No.: US 10,238,029 B2
(45) Date of Patent: Mar. 26, 2019

(54) DOFFER FOR COTTON PICKER HARVESTERS

(71) Applicant: Dimitrios Gkalekos, Larissa (GR)

(72) Inventor: Dimitrios Gkalekos, Larissa (GR)

(*) Notice: Subject to any disclaimer, the term of this patent is extended or adjusted under 35 U.S.C. 154(b) by 8 days.

(21) Appl. No.: 15/464,545

(22) Filed: Mar. 21, 2017

(65) Prior Publication Data

US 2017/0202145 A1    Jul. 20, 2017

(51) Int. Cl.
*A01D 46/16* (2006.01)
*A01D 46/14* (2006.01)

(52) U.S. Cl.
CPC ............ *A01D 46/16* (2013.01); *A01D 46/14* (2013.01)

(58) Field of Classification Search
CPC ......... A01D 46/14; A01D 46/08; A01D 46/16
See application file for complete search history.

(56) References Cited

U.S. PATENT DOCUMENTS

| | | | | |
|---|---|---|---|---|
| 2,034,907 A | * | 3/1936 | Johnston | A01D 46/14 56/40 |
| 2,654,203 A | * | 10/1953 | Parkerton | A01D 46/14 56/41 |
| 2,670,585 A | * | 3/1954 | Hagen | A01D 46/14 56/41 |
| 2,688,225 A | * | 9/1954 | Morkoski | D01B 1/02 56/44 |
| 2,700,266 A | * | 1/1955 | Walker | A01D 46/14 56/41 |
| 3,333,406 A | * | 8/1967 | Parkerton | A01D 46/14 56/41 |
| 5,323,592 A | * | 6/1994 | Davenport | A01D 46/14 56/33 |

* cited by examiner

*Primary Examiner* — Alicia Torres
(74) *Attorney, Agent, or Firm* — Kenneth E. Barnes

(57) ABSTRACT

Improved doffer discs for spindle-type cotton picker harvesters. Several embodiments for use with row units from major equipment manufacturers include improved doffer lugs having an asymmetric profile, with an essentially perpendicular leading face and sloped trailing face; as well as use of a improved flat loop having a concave rim.

4 Claims, 6 Drawing Sheets

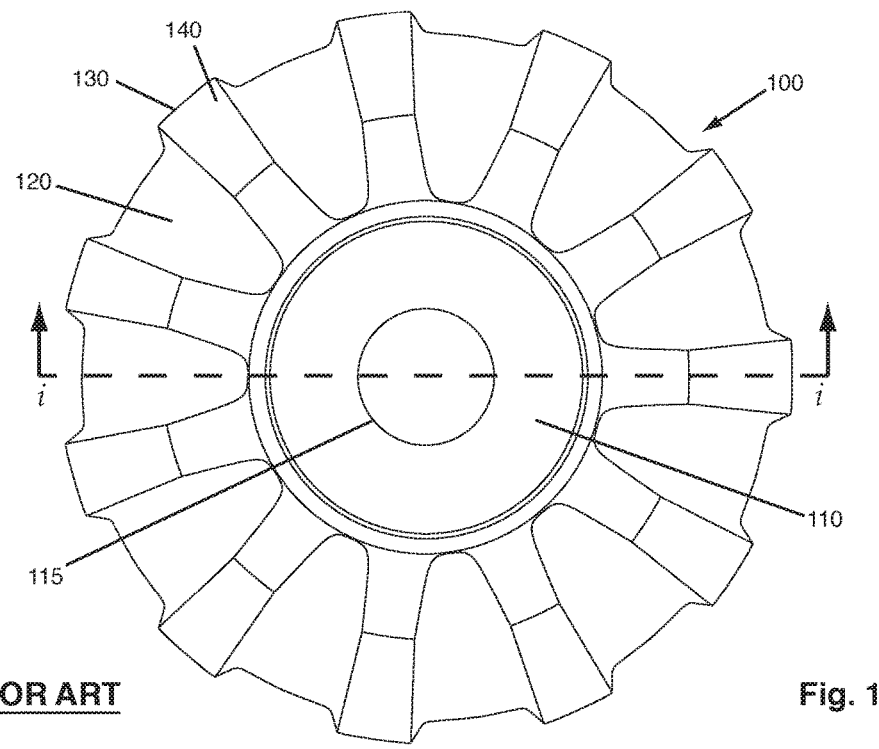
PRIOR ART                                           Fig. 1
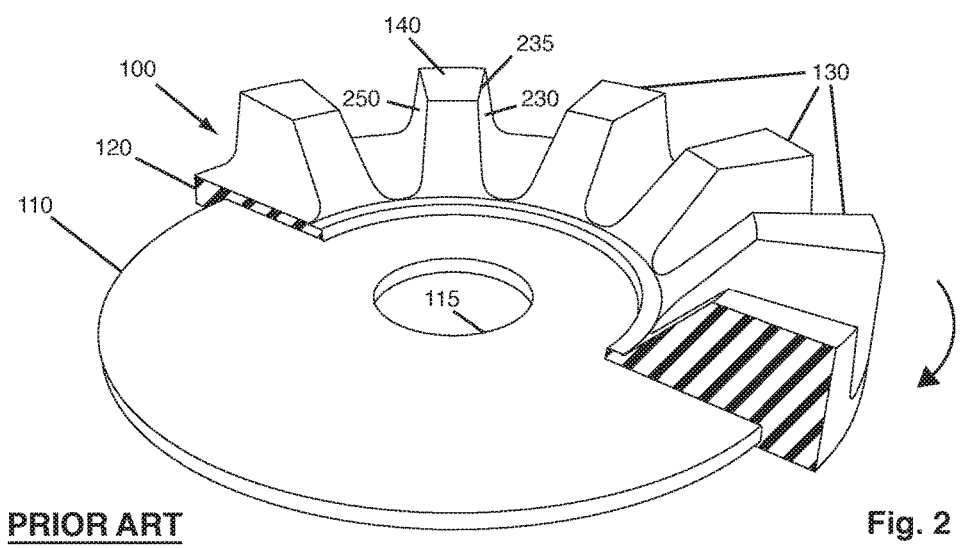
PRIOR ART                                           Fig. 2

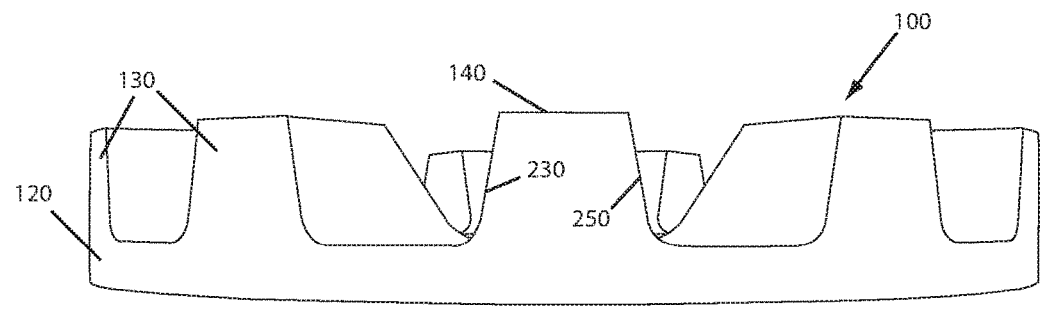
PRIOR ART    Fig. 3
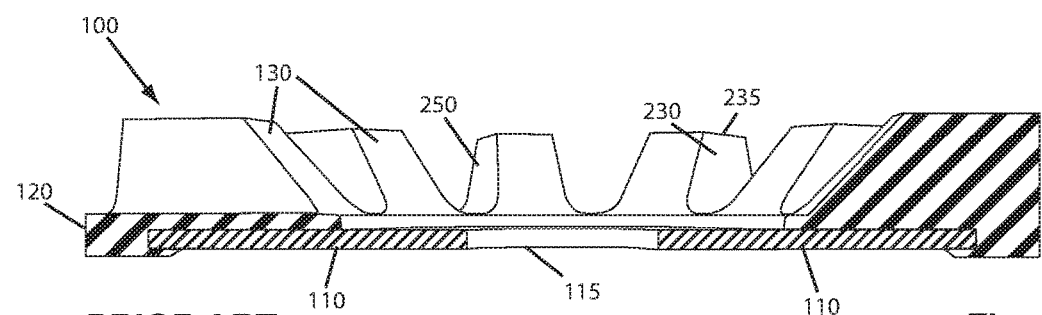
PRIOR ART    Fig. 4

DOFFER FOR COTTON PICKER HARVESTERS

BACKGROUND OF THE INVENTION

The row units of spindle-type cotton picker harvesters typically contain rotating vertically-oriented drums having multiple rows of rotating knurled (or barbed) conical spindles which, as the harvester moves along the row of cotton plants, contact the open bolls to extract the seed cotton, winding the cotton fibers onto the spindles, which are then unspooled by a rotating drum consisting of a stack of doffing discs which are configured to wipe (or doff) the seed cotton from the spindles, after which the cotton fiber is then collected by a vacuum system for further processing. The doffing discs consist of a circular base on which multiple resilient raised lugs are formed, the lugs arranged circumferentially on one side of the doffing disc, with each lug having a flat doffing face parallel to the base. Multiple doffing discs are mounted on a vertical shaft, and are spaced apart either by separate spacers which are adjacently mounted on the shaft between the doffing discs, or by integral spacers which are part of the doffing discs.

The doffing discs are oriented on the vertical shaft with their lug side downwards, and the height of the doffing discs is adjusted such that the flat doffing faces of the lugs graze the top of the spindles as they rotate past, unwinding the cotton fibers from the base of the conical spindle to the tip. The lugs of existing doffer discs have a symmetric, generally trapezoidal, profile when viewed along the radius of the disc, with the leading and trailing sides of the lugs being sloped between the doffing face and the base. Having this sloped configuration on the leading side of the lug can result in seed cotton being forced down between the spindle and the doffing face of the lug, where it places upwards force on the doffer disc and downward force on the spindle, resulting in increased stress and wear on the doffer lugs and spindle, leading to vibration and "rounding off" of the leading edge of the doffer lug, producing inefficient doffing.

Doffer discs are typically manufactured from a resilient material like rubber, or now more often polyurethane elastomer, which is formed around a supporting loop or hub of rigid material, usually metal. Conventional doffer discs which lack integrated spacers, such as are used in John Deere cotton pickers, are formed around a flat metal disk, or loop, which has a central hole for mounting the doffer disc on the vertical shaft. In addition to serving as a mounting point, the metal loop is held in compression between the adjacent spacers, and provides internal support to the resilient base and lugs of the doffer disc. The stress on the doffer disc caused by seed cotton being forced between the doffing face of the lug and the spindle by the sloped leading side of the doffer lug, as described above, can also cause momentary flexing of the metal loop, which can result in vibration and increased wear of the doffer disc and the lugs. A need therefore exists for improved doffer discs that provide reduced vibration, increased wear resistance, and more efficient doffing.

BRIEF DESCRIPTION OF THE DRAWINGS

FIG. 1 is a plan view of a prior art doffer disc.

FIG. 2 is an oblique partial cross-sectional view of a prior art doffer disc in which the resilient portion of the disc has been sectioned along line i-i of FIG. 1 to illustrate the flat loop.

FIG. 3 is an elevation view of a prior art doffer disc viewed along line i-i of FIG. 1.

FIG. 4. is a cross-sectional elevation view of an prior art doffer disc sectioned along line i-i of FIG. 1.

REFERENCE NUMBERS

Figure 5:
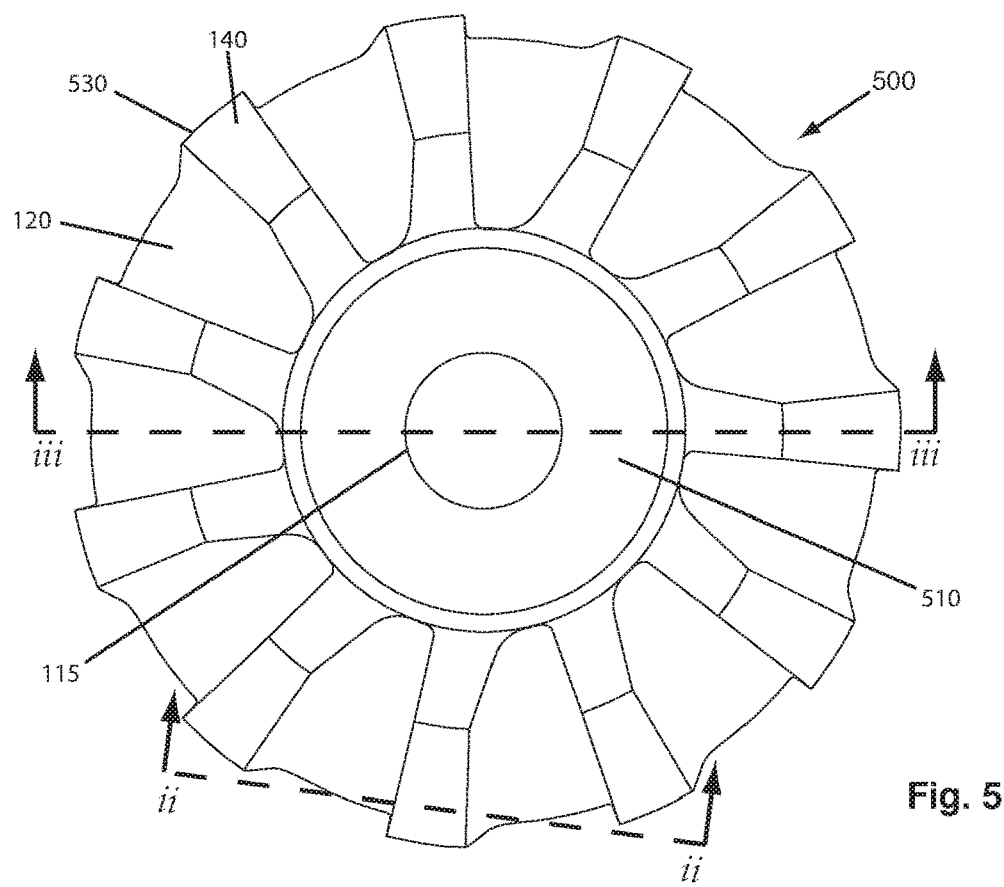
FIG. 5 is a plan view of an improved doffer disc according to an embodiment of the invention.

100 Doffer disc (prior art)
110 Loop (prior art)
115 Mounting hole
120 Base
130 Lugs (prior art)
140 Doffing surface
230 Leading face (prior art)
235 Leading edge (prior art)
250 Trailing face (prior art)
500 Doffer disc (improved)
510 Loop (improved)
515 Concave rim
517 Bevel
530 Lugs (improved)
540 Leading face (improved)
545 Leading edge (improved)
550 Trailing face (improved)
900 Doffer disc (improved loop only)
910 Doffer disc (improved lugs only)
920 Doffer w/integral spacer (improved)
930 Base
940 Hub
942 Mounting hole 944 Spacer
946 Ribs
950 Lugs (improved)
952 Doffing surface
954 Leading face (improved)
956 Leading edge (improved)
958 Trailing face (improved)

DETAILED DESCRIPTION OF THE DRAWINGS

As shown in FIGS. 1-4, in the prior art doffer disc 100, a plurality of raised lugs 130 are arranged circumferentially on one side of a circular base 120, which is formed around a flat circular loop 110 having a central mounting hole 115. The lugs 130 are formed integrally to the base 120, and are made of a suitably resilient material, such as rubber, or more recently, polyurethane elastomer. The loop 110 is made of a rigid material, such as metal, and provides support to the base 120 and lugs 130 which form the resilient portion of the doffer disc 100.

Referring to FIG. 2, the resilient portion of the doffer disc 100 has been sectioned along line i-i to illustrate the flat loop 110. The resilient portion of the doffer 100 may be formed by casting it around the loop 110. The mounting hole 115 in the loop 110 provides a means for mounting the doffer disc 100 on a doffer shaft, in the conventional manner, by which it can be driven to rotate in the direction of the arrow. For convenience of illustration, the lugs 130 are shown extending upwards from the base 120, as they would be seen if the doffer disc 100 was lying flat on a table, but in use, the doffer disc 100 would be mounted with the lugs 130 extending downwards. Accordingly, the direction of rotation for the doffer 100, given by the arrow, is noted according to the viewpoint of an observer looking up at the mounted doffer 100 from below.

The shape of a lug 130 in the prior art doffer 100 is symmetrical along the radius of the doffer 100, and has a leading face 230, and a trailing face 250 which are sloped between the base 120 and a doffing surface 140 which is parallel to the base 120, forming a generally symmetric trapezoidal profile in elevation (see FIG. 3). The edge of the leading face 230 at the doffing surface 140 is the leading edge 235, which first makes contact with the seed cotton spooled on the spindle as the doffer rotates.

In use, the slope of the leading face 230 of the lug 130 can cause seed cotton to be driven downwards between the spindle and doffing surface 140, producing upwards force on the doffer disc 100 and downward force on the spindle, leading to vibration, placing stress on the spindle and its bearings, and causing increased wear of the lugs 130 of the doffer disc 100, reducing doffing efficiency and shortening the useful life of the doffer disc 100, due to "rounding off" of the leading edges 235 of the lugs 130. These increased stresses and wear can increase maintenance costs, and necessitate more frequent replacement of doffers, which also increases operating costs. Inefficient doffing can also reduce yields.

The stress on the doffer disc 100 caused by seed cotton being forced between the doffing surface 140 of the lug 130 and the spindle by the sloped leading face 230 of the doffer lug 130, as described above, can also cause momentary flexing of the loop 110, which can contribute to vibration and increased wear of the doffer disc 100 and the lugs 130.

FIG. 5 depicts a plan view of an improved doffer disc 500 according to an embodiment of the invention. In the improved doffer disc 500, a plurality of raised lugs 530 are arranged circumferentially on one side of a circular base 120, which is formed around an improved loop 510, having a central mounting hole 115. The lugs 530 are formed integrally to the base 120, and are made of a suitably resilient material, such as rubber, or in a preferred embodiment, polyurethane elastomer. The improved loop 510 is made of a suitable rigid material, and in a preferred embodiment is made of metal. The improved loop 510 provides support to the base 120 and lugs 530 which form the resilient portion of the improved doffer disc 500.

Figure 6:
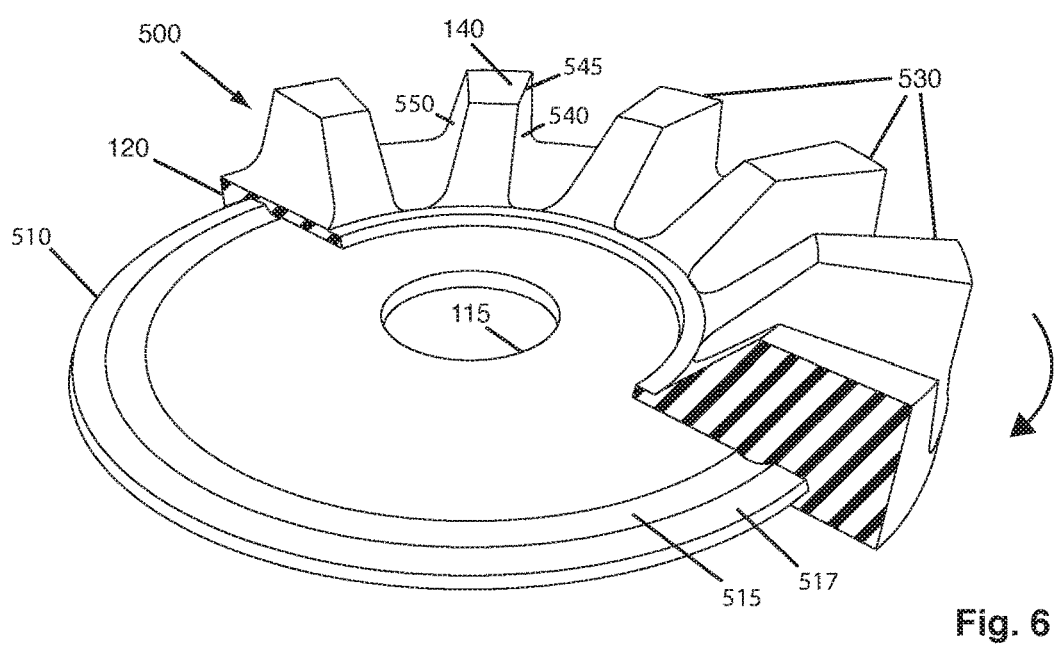
FIG. 6 is an oblique partial cross-sectional view of an improved doffer disc according to an embodiment of the invention, in which the resilient portion of the disc has been sectioned along line iii-iii of FIG. 5 to illustrate the improved loop.

Referring to FIG. 6, the resilient portion of a doffer disc 500 according to an embodiment of the invention has been sectioned along line iii-iii to illustrate the improved loop 510. In the improved loop 510, a concave rim 515 is formed in the outer edge of the loop 510, which in a preferred embodiment is formed by stamping. In use, the concave rim 515 provides improved stiffness to the loop 510, resisting the flexing seen in the prior art, and reducing vibration. In a preferred embodiment, the resilient portion of the doffer 500 is formed by casting it around the loop 510. The mounting hole 115 in the loop 510 provides a means for mounting the doffer disc 500 on a doffer shaft, in the conventional manner, by which it can be driven to rotate in the direction of the arrow. For convenience of illustration, the lugs 530 are shown extending upwards from the base 120, as they would be seen if the improved doffer disc 500 was lying flat on a table, but in use, the doffer disc 500 would be mounted with the lugs 530 extending downwards. Accordingly, the direction of rotation for the doffer 500, given by the arrow, is noted according to the viewpoint of an observer looking up at the mounted doffer 500 from below.

Figure 7:
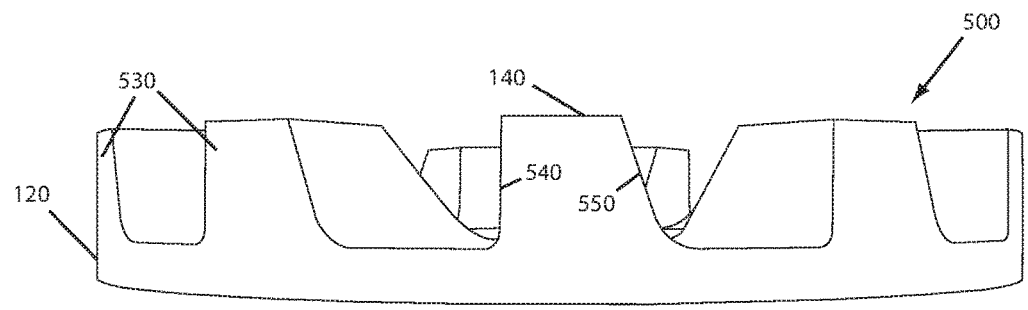
FIG. 7 is an elevation view of an improved doffer disc according to an embodiment of the invention, viewed along line iii-iii of FIG. 5.

FIG. 7 depicts an elevation view of an improved doffer disc 500 according to an embodiment of the invention, as viewed along line iii-iii of FIG. 5. In the improved doffer disc 500, the doffer lugs 530 are formed to be asymmetric.

The shape of a lug 530 in the improved doffer 500 is asymmetric in elevation when viewed along the radius of the doffer 500, having a leading face 540 that is substantially perpendicular to the base 120, and a trailing face 550 which is sloped between the base 120 and a doffing surface 140 which is parallel to the base 120. In use, lugs 530 having a leading face 540 that is substantially perpendicular to the base 120 minimize the downward deflection of seed cotton between the doffing surface 140 and spindle, preventing the associated vibration and increased stress and wear seen in the prior art, while providing more aggressive and efficient doffing, extending the useful life of the doffer disc 500, reducing down time and operating and maintenance costs, and increasing yields.

Figure 8:
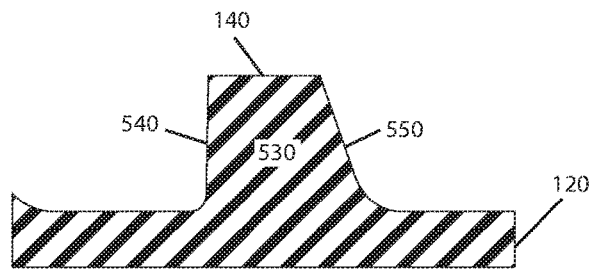
FIG. 8 is a partial cross-sectional elevation view of an improved doffer according to an embodiment of the invention, in which the resilient portion of the doffer has been sectioned along line ii-ii of FIG. 5 to illustrate the asymmetric profile of the improved lug.

FIG. 8 is is a partial cross-sectional elevation view of an improved doffer according to an embodiment of the invention, in which the resilient portion of the doffer has been sectioned along line ii-ii of FIG. 5 to illustrate the asymmetric profile of the improved lug 530. In a preferred embodiment, the slope of the trailing face 550 of the lug 530 is greater than that in the prior art, so as to provide additional thickness and rigidity to the improved lug 530 to resist bending, while also being limited by the need to maintain spacing between lugs 530 so that doffed seed cotton is efficiently swept into the collection system.

Figure 9:
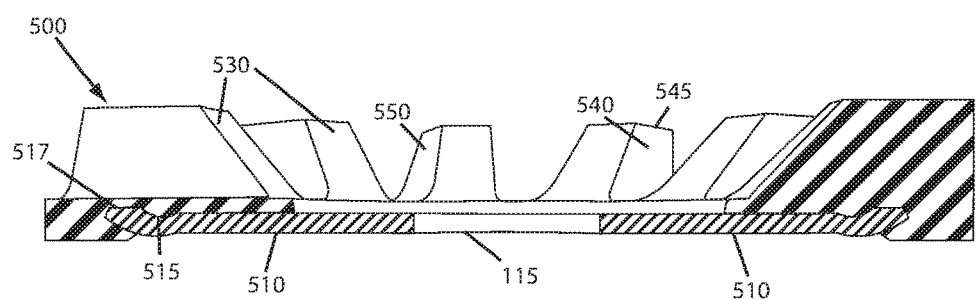
FIG. 9 is a cross-sectional elevation view of an improved doffer disc according to an embodiment of the invention, sectioned along line iii-iii of FIG. 5.

Referring to FIG. 9, a doffer disc according to an embodiment of the invention has been sectioned along line iii-iii of FIG. 5 and is shown in elevation to illustrate the profile of the improved loop. In a preferred embodiment, after stamping of the concave rim 515 in the improved loop 510, a bevel 517 is machined in the inward edge of the concave rim 515 so that the lug side of the loop 510 remains flat, and the thickness of the resilient material of the base 120 at that point is maintained.

Figure 10:
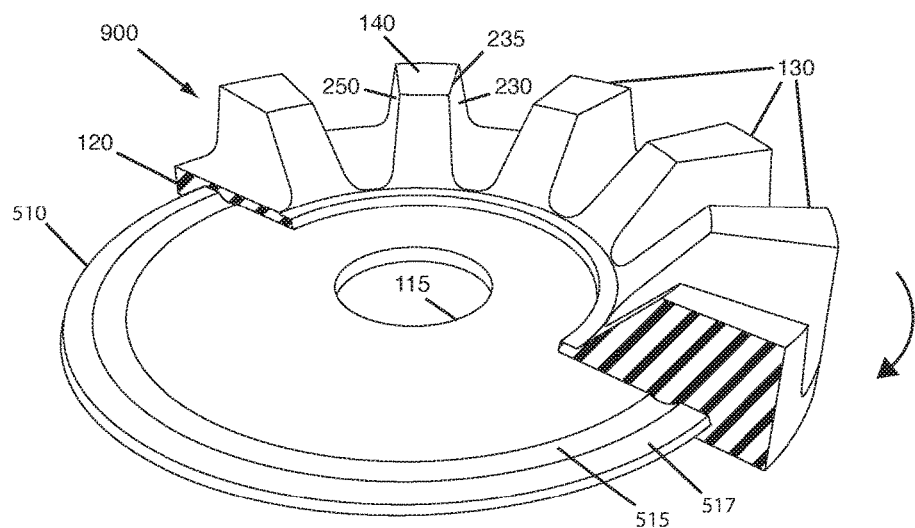
FIG. 10 is an oblique partial cross-sectional view of an improved doffer disc according to an embodiment of the invention, corresponding to the same view as FIG. 2, and illustrating an improved loop.
Figure 11:
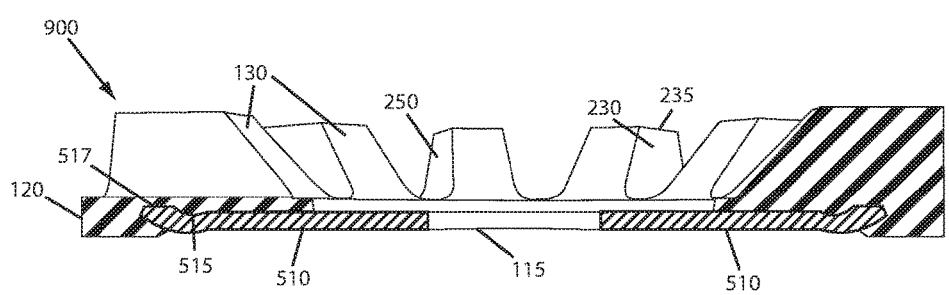
FIG. 11 is a cross-sectional elevation view of an improved doffer according to an embodiment of the invention, corresponding to the same view as FIG. 4, and illustrating an improved loop.
Figure 12:
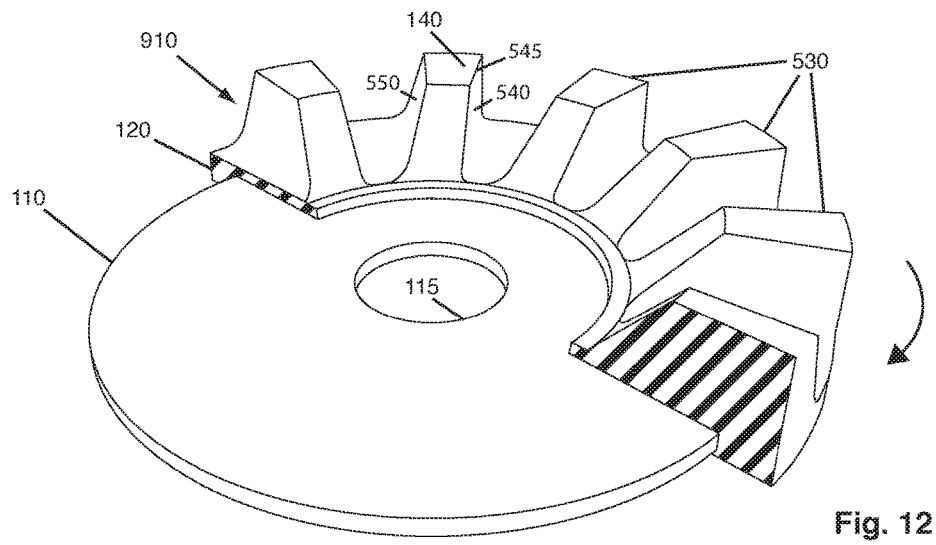
FIG. 12 is an oblique partial cross-sectional view of an improved doffer disc according to an embodiment of the invention, corresponding to the same view as FIG. 6, except that a conventional flat loop is used.
Figure 13:
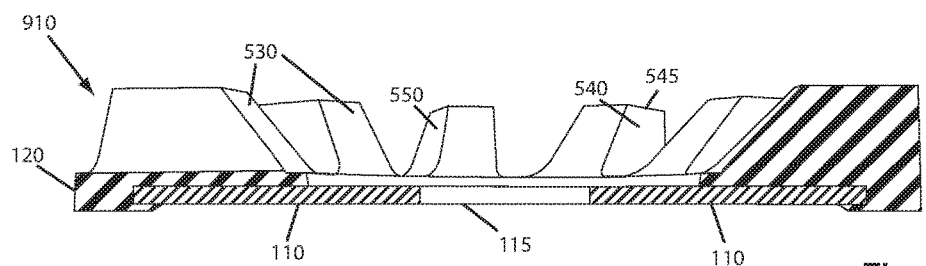
FIG. 13 is s a cross-sectional elevation view of an improved doffer disc according to an embodiment of the invention, corresponding to the same view as FIG. 9, except that a conventional flat loop is used.

Although the improved lugs and improved loop according to the invention are preferably used in combination as depicted in FIGS. 5-9, the improved loop may be combined with the prior art lugs as depicted in FIGS. 10 and 11, or the improved lugs combined with the prior art flat loop as shown in FIGS. 12 and 13.

FIG. 10 is an oblique partial cross-sectional view of an improved doffer disc 900 according to an embodiment of the invention, corresponding to the view in FIG. 2, and illustrating the combination of an improved loop 510 with prior art lugs 130. The lugs 130 are formed integrally to the base 120, and are made of a suitably resilient material, such as rubber, or in a preferred embodiment, polyurethane elastomer. The improved loop 510 is made of a suitable rigid material, and in a preferred embodiment is made of metal. In the improved loop 510, a concave rim 515 is formed in the outer edge of the loop 510, which in a preferred embodiment is formed by stamping. In a preferred embodiment, after stamping of the concave rim 515 in the improved loop 510, a bevel 517 is machined in the inward edge of the concave rim 515 so that the lug side of the loop 510 remains flat, and the thickness of the resilient material of the base 120 at that point is maintained. The resilient portion of the doffer 900 may be formed by casting it around the loop 510. The mounting hole 115 in the loop 510 provides a means for mounting the doffer disc 900 on a doffer shaft, in the conventional manner, by which it can be driven to rotate in the direction of the arrow. For convenience of illustration, the lugs 130 are shown extending upwards from the base 120, as they would be seen if the doffer disc 900 was lying flat on a table, but in use, the doffer disc 900 would be mounted with the lugs 130 extending downwards. Accordingly, the direction of rotation for the doffer 900, given by the arrow, is noted according to the viewpoint of an observer looking up at the mounted doffer 100 from below.

As shown in a cross-sectional elevation view in FIG. 11, the profile of the improved loop 510 features a concave rim 515 which in use provides improved stiffness to the loop 510, resisting the flexing seen in the prior art, and reducing vibration.

FIG. 12 is an oblique partial cross-sectional view of an improved doffer disc 910 according to an embodiment of the invention, corresponding to the view in FIG. 6, and illustrating the combination of improved lugs 530 with a conventional flat loop 110. The lugs 530 are formed integrally to the base 120, and are made of a suitably resilient material, such as rubber, or in a preferred embodiment, polyurethane elastomer. The loop 110 is made of a rigid material, such as metal, and provides support to the base 120 and lugs 530 which form the resilient portion of the doffer disc 910. The resilient portion of the doffer 910 may be formed by casting it around the loop 110. The mounting hole 115 in the loop 110 provides a means for mounting the doffer disc 910 on a doffer shaft, in the conventional manner, by which it can be driven to rotate in the direction of the arrow. For convenience of illustration, the lugs 530 are shown extending upwards from the base 120, as they would be seen if the doffer disc 910 was lying flat on a table, but in use, the doffer disc 910 would be mounted with the lugs 530 extending downwards. Accordingly, the direction of rotation for the doffer 910, given by the arrow, is noted according to the viewpoint of an observer looking up at the mounted doffer 910 from below.

As shown in a cross-sectional elevation view in FIG. 13, the improved lugs 530 feature a leading face 540 that is substantially perpendicular to the base 120, which minimizes the downward deflection of seed cotton between the doffing surface 140 and spindle, preventing the associated vibration and increased stress and wear seen in the prior art, while providing more aggressive and efficient doffing, extending the useful life of the doffer disc 910, reducing down time and operating and maintenance costs, and increasing yields.

Figure 14:
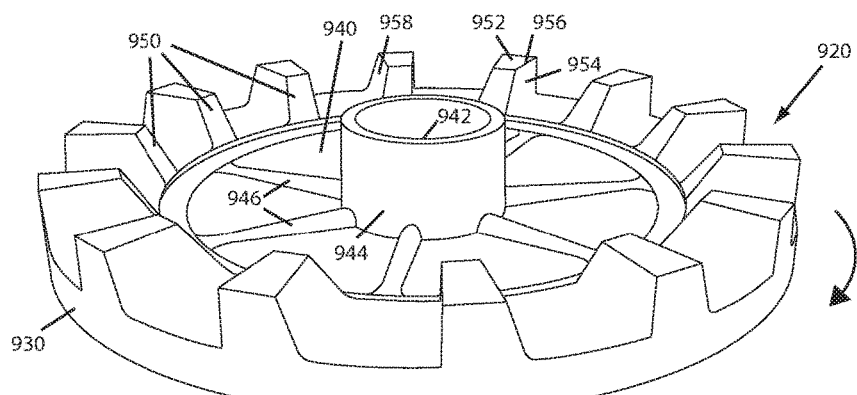
FIG. 14 is an oblique view of an improved doffer disc having a hub with an integral spacer according to an embodiment of the invention.

Referring to FIG. 14, a doffer disc with an integral spacer 920 according to another embodiment of the invention is shown. In this embodiment, a plurality of improved raised lugs 950 are arranged circumferentially on one side of a circular base 930, which is formed around a hub 940 having an integrated spacer 944 perpendicular to a central mounting hole 942. The integrated spacer 944 is flanked by supporting ribs 946. Doffers discs having a hub 940 with an integral spacer 944 are used in cotton picker harvesters manufactured by Case-IH. In this embodiment, the base 930 and lugs 950 are made of a suitably resilient material, such as rubber, and in a preferred embodiment are made of polyurethane elastomer, and are formed by casting around a conventional hub 940. The hub 940 is made from a suitably rigid material, such as metal, and in a preferred embodiment is cast aluminum. In this embodiment of the invention, the improved concave rim 515 of the loop 510 seen in FIGS. 6, 8, 9, and 10 is not used, due to design differences between the hubs used in Case-IH doffer discs and the loops used in the John Deere doffer discs, however the improved lugs 950 are shaped as described in the previously described embodiments.

It should be noted that although the improved doffer lugs as shown and described in the preceding embodiments of the invention are always oriented so that their leading faces are towards the direction of the rotation of the doffer discs, it will be understood by those skilled in the art to which the invention pertains that some doffers in certain cotton picker harvester row units rotate in the opposite direction to that previously shown, and that in embodiments of the present invention having the opposite direction of rotation, the leading faces of the improved lugs will be oriented towards the direction of rotation, and those doffers will thus appear as mirror images to the embodiments previously shown and described.

Although the invention has been shown and described with reference to certain specific presently preferred embodiments, the given embodiments should not be construed as limitations on the scope of the invention, but as illustrative examples, and those skilled in the art to which this invention pertains will undoubtedly find alternative embodiments obvious after reading this disclosure. With this in mind, the following claims are intended to define the scope of protection to be afforded the inventor, and these claims shall be deemed to include equivalent constructions insofar as they do not depart from the spirit and scope of the present invention.

What is claimed is:

1. An improved doffer for cotton harvesting machines, comprising a resilient annular base portion formed around a rigid internal support comprising a flat loop having an axially oriented concave rim formed in an outer edge of the loop and a central hole adapted for centering and mounting on a doffer shaft for rotation, said central hole defining an axis of rotation; said resilient annular base portion being formed around said axially oriented concave rim of said flat loop and having a generally planar primary face comprising a plurality of lugs circumferentially spaced radially outward of said axis of rotation, each of said plurality of lugs comprising a doffing surface substantially parallel to the generally planar primary face of said resilient annular base portion, a leading face oriented with respect to the direction of rotation about said axis of rotation, and a trailing face oriented opposite to the direction of rotation about said axis of rotation.

2. An improved doffer for cotton harvesting machines, comprising a resilient annular base portion formed around a rigid internal support, said rigid internal support comprising a central hole adapted for centering and mounting on a doffer shaft for rotation, said central hole defining an axis of rotation; said resilient annular base portion having a generally planar primary face comprising a plurality of lugs circumferentially spaced radially outward of said axis of rotation, each of said plurality of lugs having a radially asymmetric profile in elevation, and each of said plurality of lugs comprising a doffing surface substantially parallel to the generally planar primary face of said resilient annular base portion, a leading face oriented with respect to the direction of rotation about said axis of rotation and substantially perpendicular to the generally planar primary face of said resilient annular base portion, and a trailing face oriented opposite to the direction of rotation about said axis of rotation and sloped outward from said doffing surface.

3. The improved doffer of claim 2, said rigid internal support further comprising a substantially cylindrical integral spacer extending axially from the periphery of said central hole.

4. An improved doffer for cotton harvesting machines, comprising a resilient annular base portion formed around a rigid internal support comprising a flat loop having an axially oriented concave rim, said rigid internal support further comprising a central hole adapted for centering and mounting on a doffer shaft for rotation, said central hole defining an axis of rotation; said resilient annular base portion having a generally planar primary face comprising a plurality of lugs circumferentially spaced radially outward of said axis of rotation, each of said plurality of lugs having a radially asymmetric profile in elevation, and each of said plurality of lugs comprising a doffing surface substantially parallel to the generally planar primary face of said resilient annular base portion, a leading face oriented with respect to the direction of rotation about said axis of rotation and substantially perpendicular to the generally planar primary face of said resilient annular base portion, and a trailing face oriented opposite to the direction of rotation about said axis of rotation and sloped outward from said doffing surface.

* * * * *